United States Patent [19]

Gernhardt et al.

[11] 4,013,427

[45] Mar. 22, 1977

[54] SLAG BATH GENERATOR

[75] Inventors: Paul Gernhardt; Siegfried Pohl; Wilhelm Danguillier, all of Bochum; Wolfgang Grams, Wanne-Eickel, all of Germany

[73] Assignee: Dr. C. Otto & Comp. G.m.b.H., Bochum, Germany

[22] Filed: Dec. 22, 1975

[21] Appl. No.: 642,899

[30] Foreign Application Priority Data

Jan. 31, 1975  Germany .......................... 2504060

[52] U.S. Cl. .................................. 48/62 R; 48/73; 48/67; 48/92; 48/197 R; 48/202; 48/DIG. 2; 122/235 P

[51] Int. Cl.² .......................... C10J 3/46; C10J 3/48

[58] Field of Search .............. 48/63, 64, 67, 69, 76, 48/77, 92, 99, 101, 197 R, 203, 206, 62 R, 73, 202, DIG. 2; 116/28 F; 122/235 P

[56] References Cited

UNITED STATES PATENTS

| 2,134,492 | 10/1938 | Telford ................... | 48/64 |
|---|---|---|---|
| 2,700,599 | 1/1955 | Kalbacl ................... | 48/197 R |
| 2,801,158 | 7/1957 | Grossman et al. ............ | 48/DIG. 2 |
| 2,851,346 | 9/1958 | Sprague ................... | 48/206 |
| 2,917,011 | 12/1959 | Korner ................... | 110/28 F |
| 2,961,310 | 11/1960 | Steever ................... | 48/206 |
| 2,971,830 | 2/1961 | Kawai et al. ............. | 48/206 |
| 3,018,174 | 1/1962 | Steever ................... | 48/63 |
| 3,145,693 | 8/1964 | Walter ................... | 122/235 P |
| 3,916,617 | 11/1975 | McKenzie et al. .......... | 48/203 |

FOREIGN PATENTS OR APPLICATIONS 168,070   10/1953   Australia ................ 48/92

*Primary Examiner*—S. Leon Bashore
*Assistant Examiner*—Peter F. Kratz
*Attorney, Agent, or Firm*—Brown, Murray, Flick & Peckham

[57] ABSTRACT

A method and apparatus for gasifying fine-grained fuel, e.g., coal and a gasifying medium, e.g., oxygen in a slag bath generator. The fine-grained fuel and gasifying medium are injected at a downwardly-inclined angle to tangentially impinge with a turbulent rotary motion upon a slag bath in the lower end of a vertically-extending reactor shaft within a pressure vessel. A desired slag bath level is maintained in the bottom of the vessel by using an overflow to discharge slag from the bath through the bottom of the vessel. A first treatment zone for the high temperature gasification of the fuel is formed between the slag bath and a circular constriction to the reactor shaft. A second treatment zone for the final gasification of the fuel at a lower temperature as compared with the temperature in the first treatment zone extends above the circumferential constriction along the reactor shaft. Fuel and gases passing through the circumferential constriction are essentially free of a turbulent rotary motion. A third treatment zone for cooling the fuel and gases discharged from the top end of the reactor shaft is formed by a cupola. Solids are separated in a hot cyclone from the gases discharged from the cupola. The solids are injected together with additional fine-grained fuel into the first treatment zone. A cooling medium is injected into the cupola to facilitate the cooling process therein.

10 Claims, 3 Drawing Figures

SLAG BATH GENERATOR

BACKGROUND OF THE INVENTION

The present invention relates to a slag bath generator in the form of a vessel providing a vertical reactor shaft and adapted to operate under pressure. More particularly, the present invention relates to such a slag bath generator wherein nozzles are employed to inject fine-grained fuel and a gasification medium at a downward angle to tangentially impinge upon a slag bath in the bottom of the vessel where a central, upwardly-extending member forms a slag bath overflow.

SUMMARY OF THE INVENTION

The nozzles used for introducing the fuel and the gasifying medium at a tangential relation to the slag bath imparts a circulating motion to the liquid slag in the bottom of the vessel. The flame and jets of fuel discharged from the nozzles are interrupted by impingement upon the surface of the bath. The liquid slag undergoes a turbulent motion which homogenizes the liquid slag bath. This also functions as a heat shield and, therefore, permits the use of exceptionally high flame temperatures. The powerful turbulence in the rotating solids-gas phase above the radiating slag bath causes a rapid exchange of gas films that adhere to the solid particles which, at the high operating temperature, accelerate the reaction process. The slag which is produced as a result of this process is discharged through a central overflow at a rate at which the slag is formed. The liquid slag is transformed into granules by quenching in a water bath located below the overflow. In this way, it is possible to confine the content of the unburnt substances in the slag granulate to less than 0.1%.

To obtain the maximum possible content of biatomic gas constituents, it is desirable to maintain the temperature directly above the slag bath at the highest possible level, preferably at a temperature of up to 2000° C. On the other hand, it is more advantageous to the reaction process if the solid, carbon-containing particles are introduced in granular form directly above the slag bath where they are not completely gasified but, instead, undergo final gasification in an upwardly-disposed part of the reactor shaft in the vessel. The temperature of the gas in this part of the reactor shaft must be lowered to a level at which the slag constituents are no longer liquid or of a doughy consistency, so that the solid particles and the entrained slag can be separated. Steps must be taken to prevent a constant segregation and accumulation of the liquid slag particles on the internal wall surface of the vessel. In the vessel where the final gasification reaction takes place, the vessel is clad with cooling pipes so that the final gasification occurs at a temperature in the range of approximately 1200° C to 1500° C.

It is an object of the present invention to control the temperature ranges required for the two gasification reactions by subdividing the reactor shaft of the slag bath generator into individual stages so that final gasification, cooling and segregation of entrained solid particles can proceed with trouble-free continuous operation at the highest possible temperature.

According to the present invention, there is provided a slag bath generator including the combination of a cylindrical pressure shell defining a vertical reactor shaft, wall means carried by the shell to form a slag bath within the lower end portion thereof, an overflow wall projecting centrally into the reactor shaft for discharging an overflow of slag from the slag bath, nozzles directed downwardly in the reactor shaft for introducing fine-grained fuel and a gasification medium in a generally-tangential direction onto the slag bath, means extending from the shell above the overflow wall for defining a circumferential constriction to the reactor shaft, a cupola coupled to the reactor shaft for forming a cooling zone, and gas-conducting means to supply cooling gas into the cupola.

The method of gasifying fine-grained fuel in a slag bath generator according to the present invention includes the steps of injecting fine-grained fuel and a gasifying medium at a downwardly-inclined angle to tangentially impinge with a turbulent rotary motion upon a slag bath in the lower end of a vertically-extending reactor shaft formed by a vessel adapted to operate under pressure, maintaining a desired slag bath level in the vessel by discharging slag through an overflow in the bottom of the vessel, using a first treatment zone lying between the slag bath and a circumferential constriction to the reactor shaft for high temperature gasification of the fuel, using a second treatment zone lying above the circumferential constriction in the reactor shaft for final gasification of the fuel at a lower temperature as compared with the temperature in the first treatment zone, the circumferential constriction being adapted to conduct fuel and gases into the second treatment zone while reducing the turbulent rotary motion thereof, and discharging the fuel and gases from the top end of the reactor shaft into a cupola forming a third treatment zone for cooling.

Thus, according to the present invention the cylindrical shell forming the reactor shaft is clad with cooling pipes and provided with a circumferential constriction above the slag overflow. The cylindrical part of the shaft adjoins the cupola which is provided with supply means for a cooled gas.

The circumferential constriction in the reactor shaft provides a heat shield for the final gasification zone with respect to the first gasification zone in the region of the rotating slag bath which is maintained at the highest possible temperature.

Advantageously the circumferential constriction is formed by inward bending of the cooling pipes which cover the interior of the shell of the vessel. The projected edge of the circumferential constriction includes projections and indentations which are produced by an alternate arrangement of greater and lesser inward bending of the cooling pipes. The arrangement being such that the cooling pipes provide a zone of constriction which has a corrugated or serrated configuration. This interrupts the turbulent and rotary motion of the gas stream above the slag bath. The gas stream which passes beyond the circumferential constriction to the upper part of the reactor shaft therefore follows a substantially vertical path of travel. This eliminates and, therefore, avoids a circulating gas motion in the upper part of the reactor shaft where solid particles would otherwise be projected against the shell of the vessel and form undesirable deposits thereon.

The gas stream in the upper part of the reactor shaft still contains carbonaceous solid material that desirably influences the conversion reaction. The final gasification reactions which take place in the upper part of the generator shaft consume part of the sensible heat of the gas. The temperature of the gas drops, for example, to approximately between 1500° C to 1200° C. The gas enters the cupola within this temperature range where the addition of a cooling gas and, where appropriate, the addition of fuel cause a sudden reduction of the temperature so that no entrained solid particles will be in a liquid or dough-like state.

The gas discharged from the cupola has a temperature of about 900° C and this gas is fed to a hot cyclone and a waste heat boiler. The solid materials separated in the hot cyclone are returned to the slag bath generator by the nozzles.

The cooling medium injected into the cupola may take the form of part of the generated gas from the gasification process or an inert gas may be employed, such as $CO_2$. A returned partial stream of the generated gas and, where appropriate, a mixture of fuel gas and steam can be used to deliver the fuel into the gasifier. This has a favorable effect on the ignitability, flame stability and reaction rate.

These features and advantages of the present invention as well as others will be more readily understood when the following description is read in light of the accompanying drawings, in which.

Figure 1:
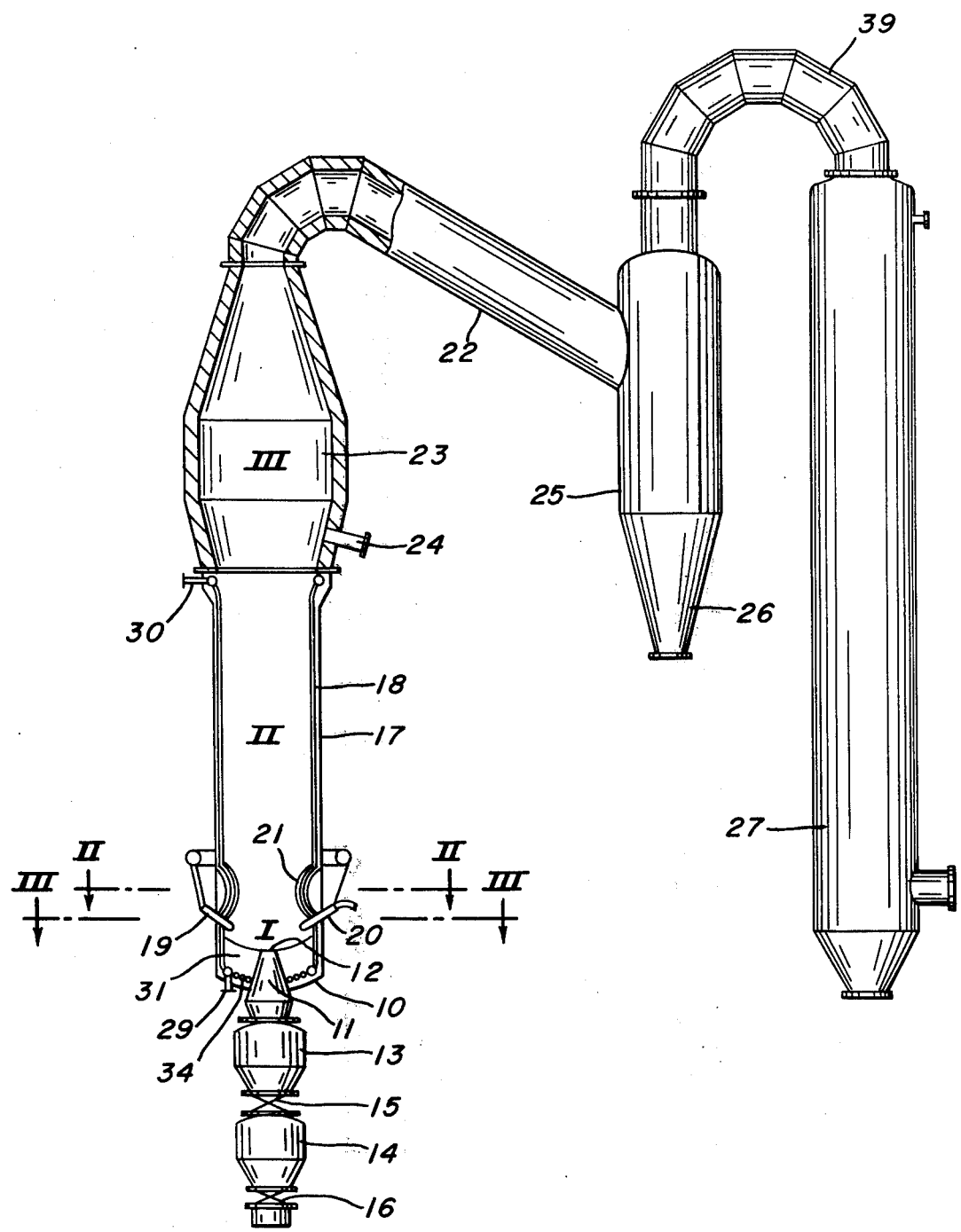
FIG. 1 is an elevational view, in section, through the central axis of a gasification vessel together with other apparatus employed according to the gasification process of the present invention.

In FIG. 1, reference numerals I, II and III identify three treatment zones for a gasification process including the use of a slag bath generator. Reference numeral 1 identifies a gasification zone above a slag bath and below a circumferential constriction 21 in a shell 17 of a slag bath generator. Reference numeral II identifies a final gasification zone which lies above the circumferential constriction 21 and extends vertically to the top of the shell 17. Reference numeral III identifies a cooling zone which is located within a cupola 23.

Figure 3:
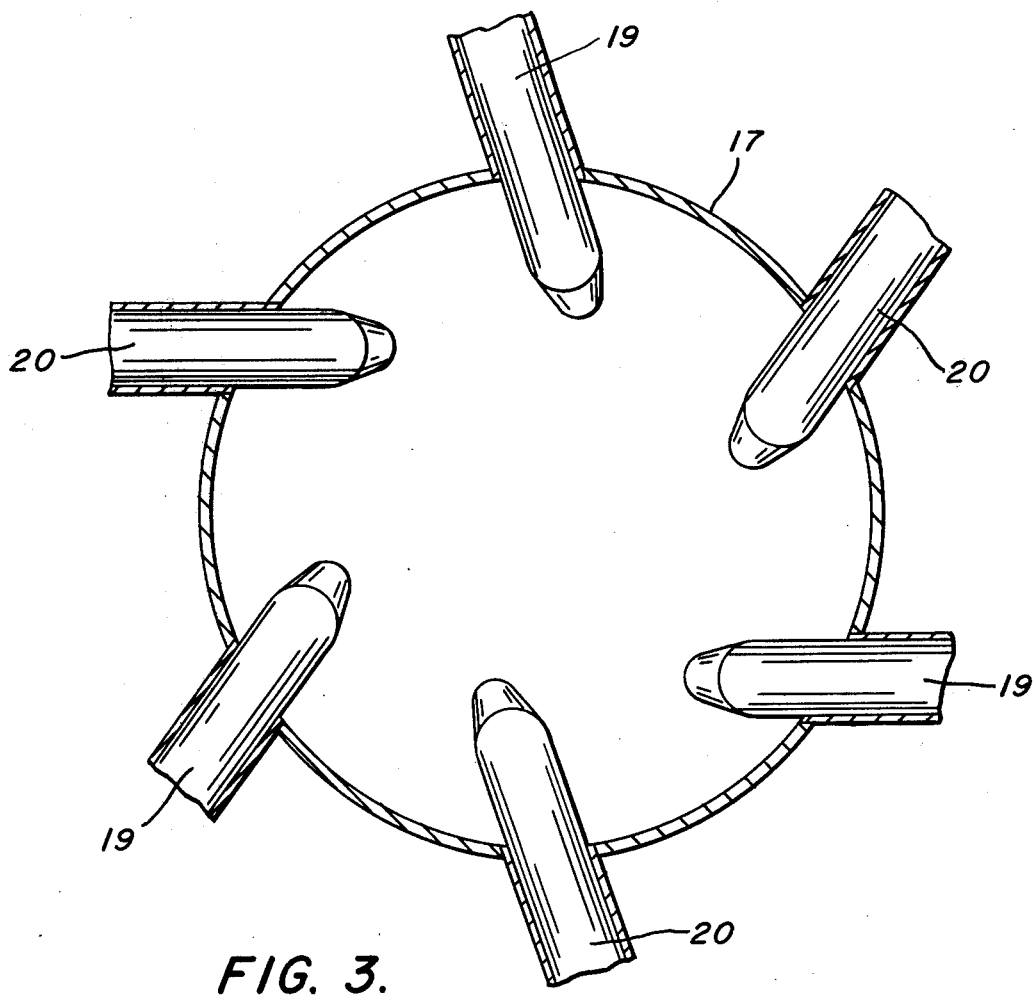
FIG. 3 is an enlarged sectional view taken along line III—III of FIG. 1.

The slag bath generator includes a bottom wall 10 which is protected by a coiled arrangement of cooling pipes 34. A conically-shaped wall 11 projects through the bottom wall 10 into the shell 17 where an overflow 12 is formed by the top rim of the conically-shaped wall 11. A slag bath 31 is formed in the bottom of the vessel. Slag is continuously generated and the slag bath is maintained at a predetermined desired height by the overflow 12 which discharges overflowing slag into a collecting tank 13. This tank is filled with water and includes a valve 15 in the bottom thereof. Underlying the collecting tank 13 is a discharge vessel 14 which has a bottom wall closed by means of a valve 16. The shell 17 of the slag bath generator forms a vertically-extending reactor shaft which is surrounded about the periphery thereof by cooling pipes 18. Cooling water is fed into a water supply pipe 29 from where the water passes through pipes 18 and into a water discharge pipe 30 at the upper end of the shell 17. Nozzles 19 and 20 are employed to introduce fine-grained fuel and a gasification medium. The fuel is, for example, finely-divided coal. Oxygen is the preferred gasification medium but steam and recycled gas may also be employed as the gasification medium. As clearly illustrated in FIGS. 1 and 3, the nozzles 19 and 20 extend at a downwardly-inclined angle such that the materials injected into the gasification vessel impinge with a tangential and turbulent rotary motion upon the slag bath 31.

Figure 2:
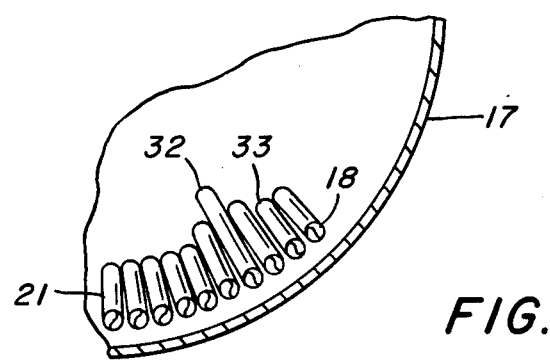
FIG. 2 is an enlarged sectional view taken along line II—II of FIG. 1.

The circumferential constriction 21 which forms a line of demarcation between treatment zones I and II is formed by kink-like bends in the cooling pipes 18. The bent portions of these pipes extend inwardly within the reactor shaft to different projected distances. As clearly illustrated in FIG. 2, the circumferential constriction 21 forms a constriction zone made up of cooling pipe projections 32. These pipe projections define indentations with respect to relatively smaller cooling pipe projections 33 in the zone of the circumferential constriction. It is clearly apparent that the bent portions of the cooling pipes 18 form a serrated configuration in the plane of the constriction. As a result, the circulating motion of the gases in zone I is decelerated. In this way, the gas stream passing into the final gasification zone, i.e., zone II, travels along a substantially perpendicular line of travel which is parallel to the extended length of the final gasification zone.

The final gasification zone II is adjoined to the third treatment zone which is a cooling zone and disposed within a cupola 23 that has an enlarged interior with respect to the diameter of the reactor shaft. The cupola is provided with a supply pipe 24 to inject a cooling gas as hereinbefore described. A duct 22 extends from the cupola 23 to a hot cyclone 25 which is, in turn, provided with a collecting vessel 26 for receiving the separated solid particles. The solid particles collected in vessel 26 are returned to the slag bath generator together with additional quantities of fine-grained fuel. Duct 39 delivers the gases from the hot cyclone 25 into a waste heat boiler 27.

Although the invention has been shown in connection with a certain specific embodiment, it will be readily apparent to those skilled in the art that various changed in form and arrangement of parts may be made to suit requirements without departing from the spirit and scope of the invention.

We claim as our invention:

1. A slag bath generator including the combination of:
   a cylindrical pressure shell defining a vertical reactor shaft,
   wall means carried by said shell to form a slag bath within the lower end portion of said reactor shaft,
   an overflow wall projecting centrally into said reactor shaft to maintain a slag bath within the lower portion of said reactor shaft by discharging an overflow of slag from said slag bath,
   nozzles directed downwardly in said reactor shaft to produce a turbulent rotary motion at the surface of the slag bath by impingement of fine-grained fuel and a gasification medium fed by said nozzles in a generally tangential direction onto said slag bath,
   vertical coolant pipes surrounding said reactor shaft within said shell, said coolant pipes extending from said shell above said overflow wall to define a circumferential constriction, some of said coolant pipes projecting into said reactor shaft at a distance greater than the distance which other coolant pipes project in a manner to provide a serrated form to said circumferential constriction,
   a cupola coupled to said reactor shaft for forming a cooling zone, and
   gas-conducting means to supply cooling gas into said cupola.

2. The slag bath generator according to claim 1 wherein said coolant pipes projecting at alternating distances into said reactor shaft include bent portions of coolant pipes dispersed about said reactor shaft on said shell.

3. The slag bath generator according to claim 1 further including a hot cyclone for separating solids from the gases discharged from said cupola.

4. The slag bath generator according to claim 3 further including a waste heat boiler receiving the gases discharged from said hot cyclone.

5. A method of gasifying fine-grained fuel in a slag bath generator, said method including the steps of:
   injecting fine-grained fuel and a gasifying medium at a downwardly-inclined angle to tangentially impinge with a turbulent rotary motion upon a slag bath in the lower end of a vertically-extending reactor shaft formed by a vessel adapted to operate under pressure,
   maintaining a desired slag bath level in the vessel by discharging slag through an overflow in the bottom of said vessel,
   using a first treatment zone lying between the slag bath and a serrated circumferential constriction to said reactor shaft for high temperature gasification of said fuel,
   forming said serrated circumferential constriction by bent portions of vertically-arranged coolant pipes surrounding said reactor shaft,
   using a second treatment zone lying above said serrated circumferential constriction in the reactor shaft for final gasification of the fuel at a lower temperature as compared with the temperature in the first treatment zone, said serrated circumferential constriction being adapted to conduct fuel and gases into the second treatment zone while reducing the turbulent rotary motion thereof, and
   discharging the fuel and gases from the top end of the reactor shaft into a cupola forming a third treatment zone for cooling the fuel and gases.

6. The method according to claim 5 including the further step of using a hot cyclone to separate the gases from the solids discharged from said cupola.

7. The method according to claim 6 including the further step of using a waste heat boiler to recover sensible heat from the gases discharged from said hot cyclone.

8. The method according to claim 6 including the further step of using the solids after separation by said hot cyclone together with additional fine-grained fuel to form said fine-grained fuel for said step of injecting.

9. The method according to claim 5 including the further step of injecting a cooling medium into said cupola to cool the fuel and gases discharged from the reactor shaft.

10. The method according to claim 5 wherein the temperature in said first treatment zone lies within the range of 1500° and 2200° C, the temperature in said second treatment zone lies within the range of 1200° and 1600° C, and the temperature in said third treatment zone does not exceed 900° C.

* * * * *